(No Model.)

R. G. McELROY.
HORSE POWER.

No. 381,807. Patented Apr. 24, 1888.

Witnesses
John H. Finch Jr.
C. D. Jost.

Inventor.
By Robert G. McElroy.
C. M. Alexander
Attorney.

N. PETERS, Photo-Lithographer, Washington, D. C.

UNITED STATES PATENT OFFICE.

ROBERT GRUN McELROY, OF UNIONTOWN, ALABAMA.

HORSE-POWER.

SPECIFICATION forming part of Letters Patent No. 381,807, dated April 24, 1888.

Application filed December 29, 1887. Serial No. 259,342. (No model.)

*To all whom it may concern:*

Be it known that I, ROBERT GRUN MCELROY, a citizen of the United States, residing at Uniontown, in the county of Perry and State of Alabama, have invented certain new and useful Improvements in Horse-Powers, of which the following is a specification, reference being had therein to the accompanying drawings.

This invention relates to an improved tension device especially for horse-powers wherein a sweep and a horizontal master-grooved belt-wheel are employed for the purpose of transmitting rotative motion to a horizontal shaft, which improvement will be fully understood from the following description, taken in connection with the annexed drawings, in which—

Figure 1:
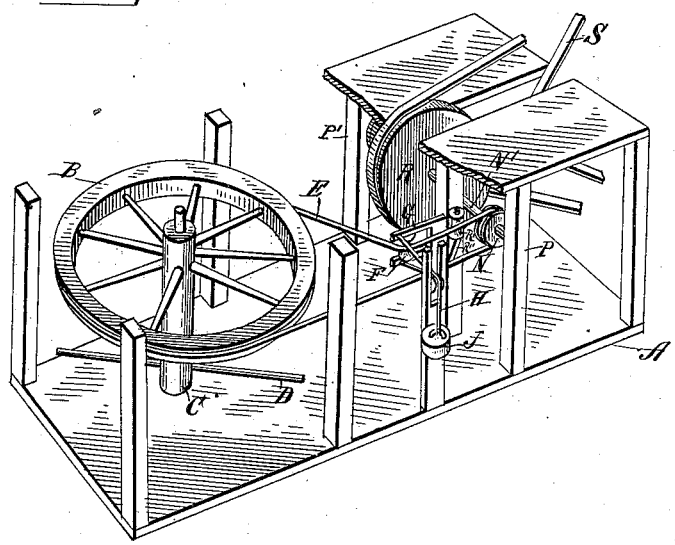
Figure 2:
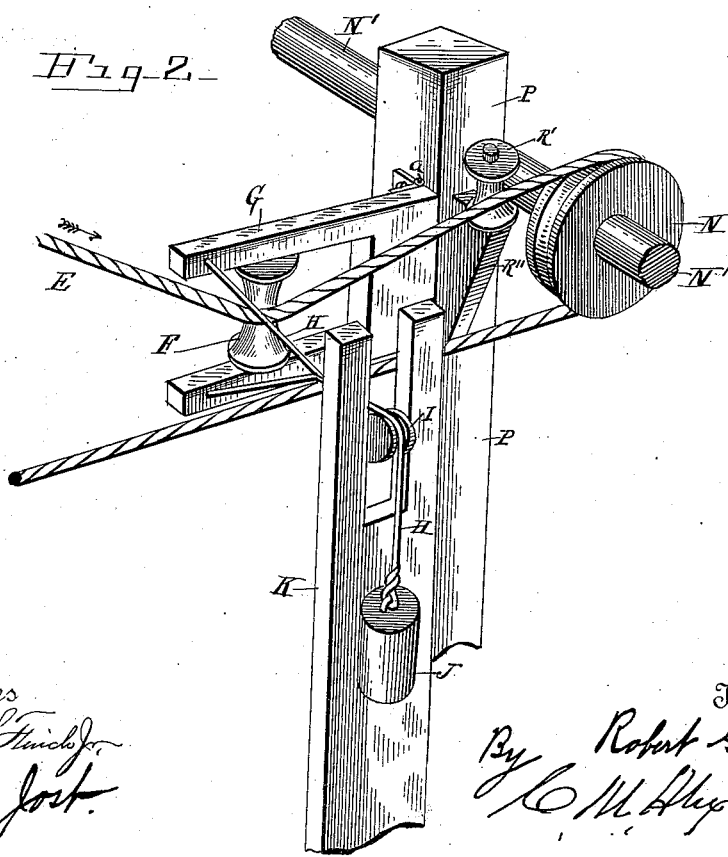

Figure 1 is a perspective view showing my improved tension device combined with a horse-power of the kind above referred to. Fig. 2 is an enlarged perspective detail showing more clearly my improved tension device combined with the endless cable or belt which transmits rotary motion to a driving-shaft.

Referring to the annexed drawings, A designates the main frame of a horse-power having my improved tension device applied to it.

B designates a horizontal master-wheel having a grooved periphery and mounted on a vertical shaft, C, to which is applied a sweep, D.

E designates an endless belt, which is passed around the master-wheel B, and also around a small grooved pulley, N, which is keyed on a horizontal shaft, N', journaled in vertical posts P P' of the main frame A. On this shaft N' is keyed a belt-wheel, R, from which rotary motion is transmitted by means of a belt, S, to a thrashing-machine or to any other machine. (Not shown.)

G designates a bifurcated wing, which is hinged at *a* to the post P, (shown in Fig. 2,) so that it is free to vibrate horizontally. In this wing is vertically journaled an annularly-grooved idler, F, against which impinges the belt E, and upon which this belt is free to play up and down on its way to the pulley N.

The wing G is provided with a rope, H, fastened to both of its tines, carried off laterally, passed over a pulley, I, and having a weight, J, attached to its depending end. The pulley I is journaled in the bifurcated portion of a post, K, and its periphery is grooved, as shown in Fig. 2.

R' designates a grooved guide-pulley, which is journaled on the stem of a bracket, R'', secured rigidly to the post P. This pulley R' guides the belt E positively upon the pulley N.

It will be observed from the foregoing description that the wing G, with its idler F, rope H, and weight J, constitutes an automatic tension device, which will keep the belt E under tension and prevent slipping thereof. It will also be observed that in combination with this tension device or belt-tightener I employ a belt guide-pulley, R', which is in the same vertical plane as the idler-pulley F, and which will co-operate with the latter to prevent the belt from leaving the groove in the periphery of the pulley N.

Having thus fully described my invention, what I claim as new, and desire to secure by Letters Patent, is—

In a horse-power, the combination, with the horizontal driving master-wheel, the driven pulley, and endless belt E, of the horizontally-swinging bifurcated wing G, bearing a vertical pulley, the rope and its weight attached to said wing, the grooved pulley I on post K, and the intermediate guiding-pulley, R', substantially as and for the purposes described.

In testimony whereof I affix my signature in presence of two witnesses.

ROBERT GRUN McELROY.

Witnesses:
 G. B. JOHNSTON,
 ROBT. W. NICOLSON.